United States Patent
Coskun et al.

(10) Patent No.: US 9,253,491 B2
(45) Date of Patent: Feb. 2, 2016

(54) METHOD AND APPARATUS FOR TRANSCODING A VIDEO SIGNAL

(75) Inventors: Orham Coskun, Manisa (TR); Ahmet Sahin, Manisa (TR); Yusuf Engin Tetik, Manisa (TR); Yusuf Selcuk Ateskan, Manisa (TR)

(73) Assignee: Vestel Elektronik Sanayi Ve, Manisa (TR)

( * ) Notice: Subject to any disclaimer, the term of this patent is extended or adjusted under 35 U.S.C. 154(b) by 2222 days.

(21) Appl. No.: 12/060,622

(22) Filed: Apr. 1, 2008

(65) Prior Publication Data

US 2008/0304570 A1 Dec. 11, 2008

Related U.S. Application Data

(60) Provisional application No. 60/909,636, filed on Apr. 2, 2007.

(51) Int. Cl.
| | |
|---|---|
| *H04N 19/132* | (2014.01) |
| *H04N 19/159* | (2014.01) |
| *H04N 19/176* | (2014.01) |
| *H04N 19/61* | (2014.01) |
| *H04N 19/137* | (2014.01) |
| *H04N 19/152* | (2014.01) |
| *H04N 19/18* | (2014.01) |
| *H04N 19/40* | (2014.01) |

(52) U.S. Cl.
CPC ........... *H04N 19/132* (2014.11); *H04N 19/137* (2014.11); *H04N 19/152* (2014.11); *H04N 19/159* (2014.11); *H04N 19/176* (2014.11); *H04N 19/18* (2014.11); *H04N 19/40* (2014.11); *H04N 19/61* (2014.11)

(58) Field of Classification Search
CPC . H04N 10/132; H04N 10/137; H04N 10/152; H04N 10/159; H04N 10/176; H04N 10/18; H04N 10/40; H04N 10/61
USPC ..................................................... 375/240.18
See application file for complete search history.

(56) References Cited

U.S. PATENT DOCUMENTS

| | | |
|---|---|---|
| 6,763,070 B1 | 7/2004 | Lee |
| 6,937,770 B1 | 8/2005 | Oguz |

(Continued)

FOREIGN PATENT DOCUMENTS

| | | |
|---|---|---|
| EP | 1553779 | 7/2005 |
| WO | WO 03/067778 | 8/2003 |

OTHER PUBLICATIONS

European search Report for Application No. EP 07251456, dated Nov. 6, 2007 ( 4 pages).

(Continued)

*Primary Examiner* — Huy D Vu
*Assistant Examiner* — Stephen J Clawson
(74) *Attorney, Agent, or Firm* — Conley Rose, P.C.

(57) ABSTRACT

The invention provides a method of transcoding a video signal made up of an input bit stream representative of frames of a video, each frame being made up of blocks of pixels, there being a corresponding block of data within the input bit stream for each block of pixels, the method comprising: for the bit stream of a frame of the video signal, identifying the type of frame; and for certain types of frame, disregarding a configurable proportion of the data in respect of plural blocks within the frame, thereby taking into account local motion activity within the frame.

24 Claims, 6 Drawing Sheets

(56) References Cited

U.S. PATENT DOCUMENTS

| | | | |
|---|---|---|---|
| 2003/0085902 A1* | 5/2003 | Vogelaar et al. | 345/505 |
| 2003/0118243 A1* | 6/2003 | Sezer et al. | 382/245 |
| 2005/0013369 A1* | 1/2005 | Lee | 375/240.16 |
| 2005/0169377 A1* | 8/2005 | Lin et al. | 375/240.16 |
| 2006/0126736 A1 | 6/2006 | Shen | |

OTHER PUBLICATIONS

Benyaminovich, Shmuel, et al., "Optimal Transrating via DCT Coefficients Modification and Dropping," Information Technology: Research and Education, 2005 (pp. 100-104).

"ISO/IEC CD 138180-: Information Technology—Generic Coding of Moving Pictures and Associated Audio Infomration Part 2: Video," International Standard—ISO, Zurich, CH.

Fung, Kai-Tat et al, New Architecture for Dynamic Frame-Skipping Transcoder, IEEE Transactions on Image Processing, vol. 11, No. 8, Aug. 2002 (15 pages).

English Translation of Official Action to Russian Application No. 2008112789 (3 pages).

* cited by examiner

Fig. 9 Block Adaptive Truncation

Fig. 10

METHOD AND APPARATUS FOR TRANSCODING A VIDEO SIGNAL

CROSS-REFERENCE TO RELATED APPLICATIONS

This application claims the benefit of priority to U.S. application Ser. No. 60/909,636, filed Apr. 2, 2007, the content of which is hereby incorporated by reference in its entirety for all purposes.

FIELD OF INVENTION

The present invention relates to a method and apparatus for transcoding a video signal.

BACKGROUND

In embodiments, the invention relates to dynamic bit-rate reduction of pre-compressed video streams. Reducing the bit-rate of a pre-compressed data stream is called transrating, and devices that perform this task are called transrators. Transrating and transrators are sub-sets of more general fields of transcoding and transcoders, respectively. Video transcoding is a process in which pre-compressed video data is converted to another compressed valid video data. Embodiments of the present invention may be used in a variety of applications where bit-rate reduction is desired or required such as in video recorders, servers, network video servers and clients.

Digital video compression has made it possible to store, stream and transport large amounts of video content which was once impractical due to the excessive size of the data files required to convey the necessary information. Digital video compression, especially the MPEG formats and particularly the MPEG-2 format is widely used in devices including DVD players, satellite and terrestrial set top boxes, network video servers and receivers and many more.

A digital video is made up of the individual still images or "frames" that, when played in sequence, are able to give the impression of movement. Although each digital video compression format has its own particular characteristics a number of common features are also present. One such common feature is the use of intra frames which are coded independently from other frames. In MPEG terminology, such frames are referred to as I frames. An I frame may be thought of as a key frame or reference video frame which acts as a point of comparison to other frames during encoding, decoding and play-back.

Another common feature is the use of inter frames which are coded with reference to other frames. They can only be decoded after their reference frames are decoded. Inter frames are of two types, commonly referred to in MPEG terminology as P frames and B frames. P frames may also be referred to as reference inter frames whereas B frames may be referred to as non-reference inter frames.

As mentioned above, transrating is a subset of a broader type of video stream processing referred to as transcoding. When used herein, transcoding is used to mean the changing of any characteristics of a digitally compressed video stream to produce a new valid digitally compressed video stream. Transrating is a transcoding process which aims only at bit-rate change, usually reduction, and it is an essential component in band-limited network environments.

Transrators with dynamic bit-rate adaptation mechanisms are particularly important when variable bit-rate (VBR) encoded video is to be streamed over a constant bit-rate (CBR) channel. If the bit-rate of the VBR video fluctuates continuously, fast adaptation is required to produce a suitable CBR output signal. Therefore, the ratio of instantaneous output bit-rate to instantaneous input bit-rate must dynamically change to produce a nearly CBR video output whose bit-rate is always below that of the transmission channel.

When transrating, there are four main issues to consider. These are complexity of the operation, quality required of the output signal, bit-rate required of the output signal and adaptation speed. A method and apparatus are sought which provides the highest quality output video using the lowest complexity of system and the lowest bit-rate with the fastest adaptation speed possible. Different transrating techniques have been developed and implemented. The architecture and performance of known systems differ and they trade speed for quality and are useful for applications with no time constraint. In other examples, the transrator architectures trade quality for speed and for simplicity such as to be useful in real-time applications.

Figure 1:
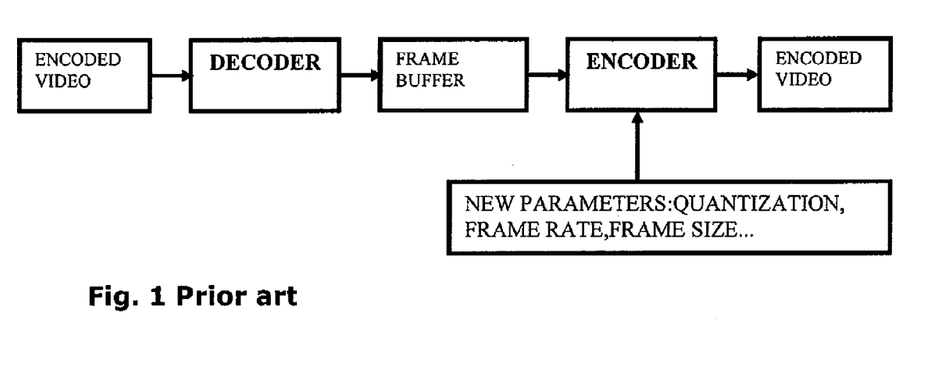
FIGS. 1 to 7 show schematic representations of known transrator architectures and methods.

Depending on their purposes and operational platforms, there are a variety of transrator architectures currently used. Examples of architectures and methods of transrating that are known are shown in each of FIGS. 1 to 7. In FIG. 1 a simple transrator is shown comprising a cascade of a decoder and an encoder. Using this architecture, the digital video stream can be decoded into frames and encoded again using different encoding parameters. The decoder and encoder parts are decoupled and this is therefore an extremely flexible transrator architecture. However the cost of this flexibility is high computational complexity, relatively low speed and high latency.

Furthermore, in spite of these high costs, the architecture does not guarantee the best output due to the fact that two inherently lossy processes (decoding and encoding) are cascaded. Thus, this architecture is impractical for most purposes.

Figure 2:
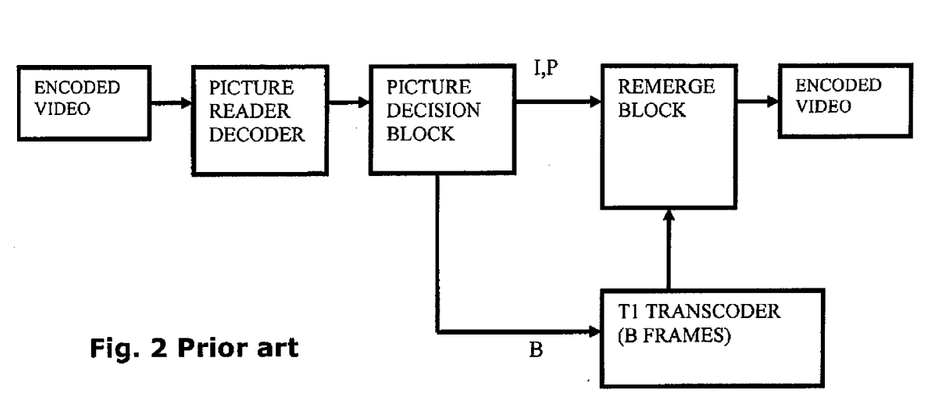
Figure 3:
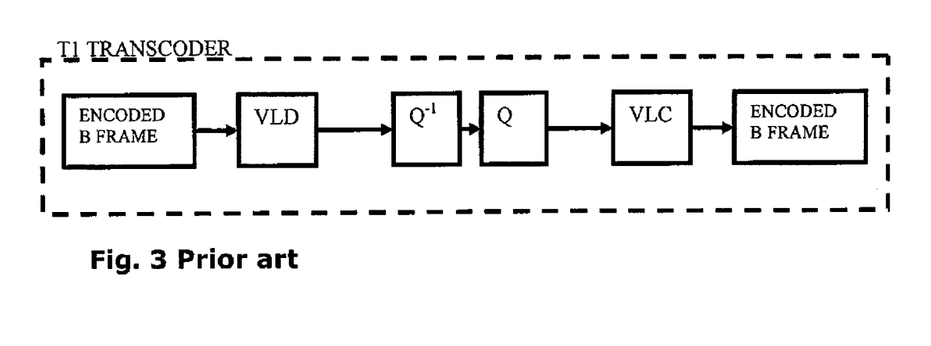

FIG. 2 shows an example in which only B frames are transcoded. I and P frames are routed directly through the system. The transcoding system used in the apparatus of FIG. 2 is shown in more detail in FIG. 3. As can be seen, the system is complex as it requires the sequence of variable length decoding, de-quantisation, inverse transformation, quantisation, forward transformation and variable length encoding. Thus, the complexity is significant. Although such an arrangement may be effective, transrating only the B frames and leaving I and P frames untouched will not produce a satisfactory reduction in bit-rate, where this required, for most digital videos. Furthermore, the complex sequence of steps performed on the B frames means that the process is slow and the lossy inverse quantisation can lead to significant degradation in quality of the output signal.

Figure 4:
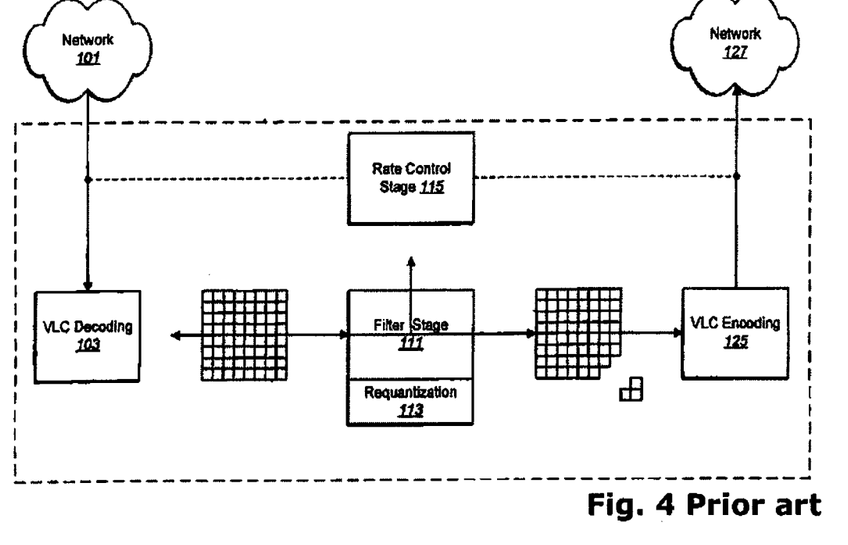
Figure 5:
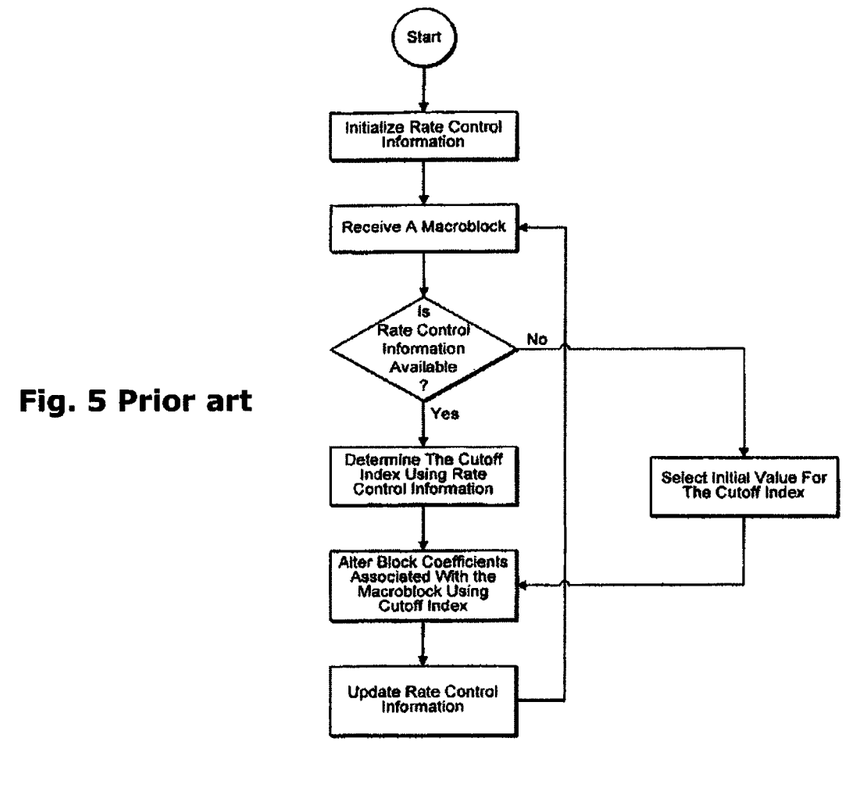
Figure 6:
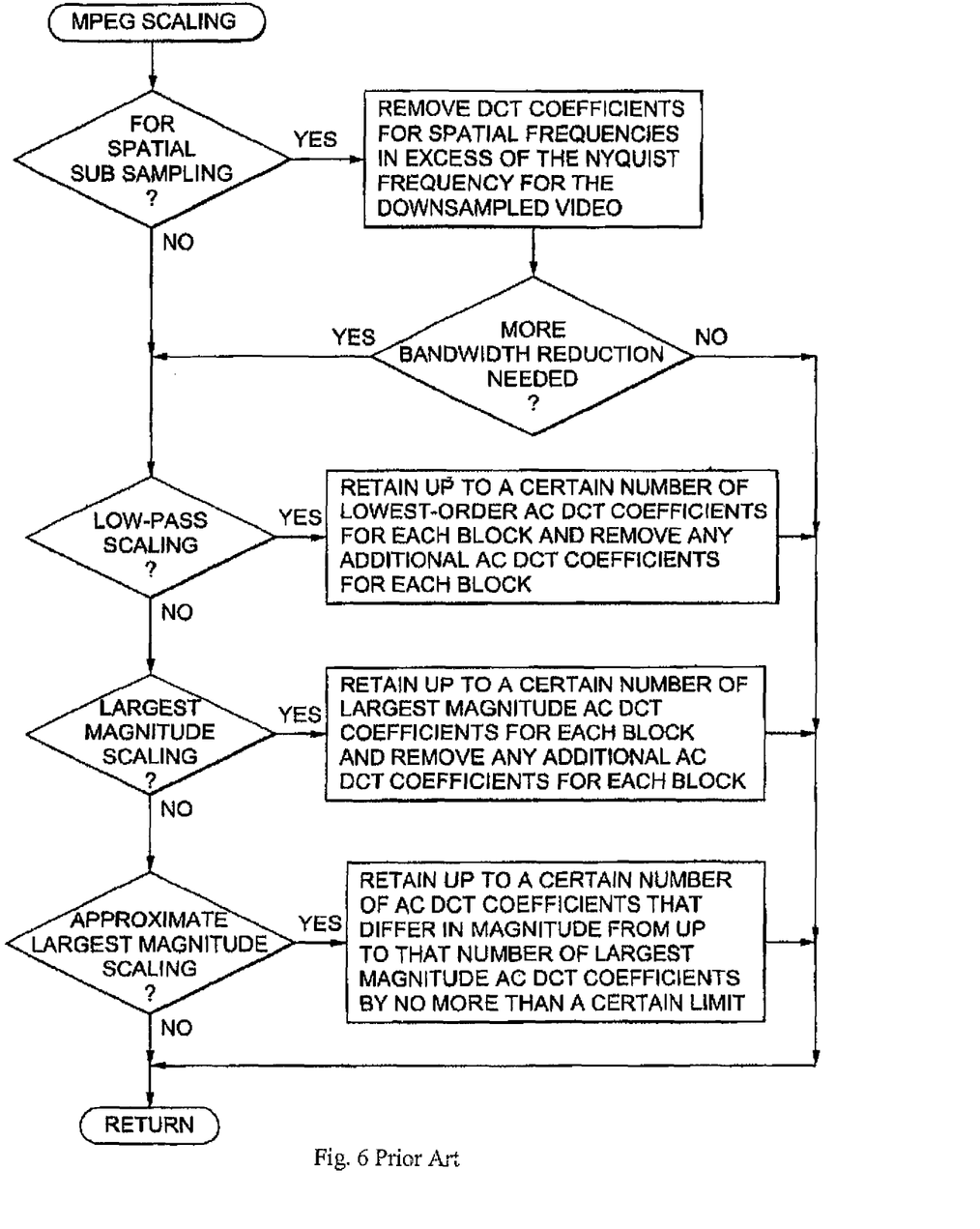
Figure 7:
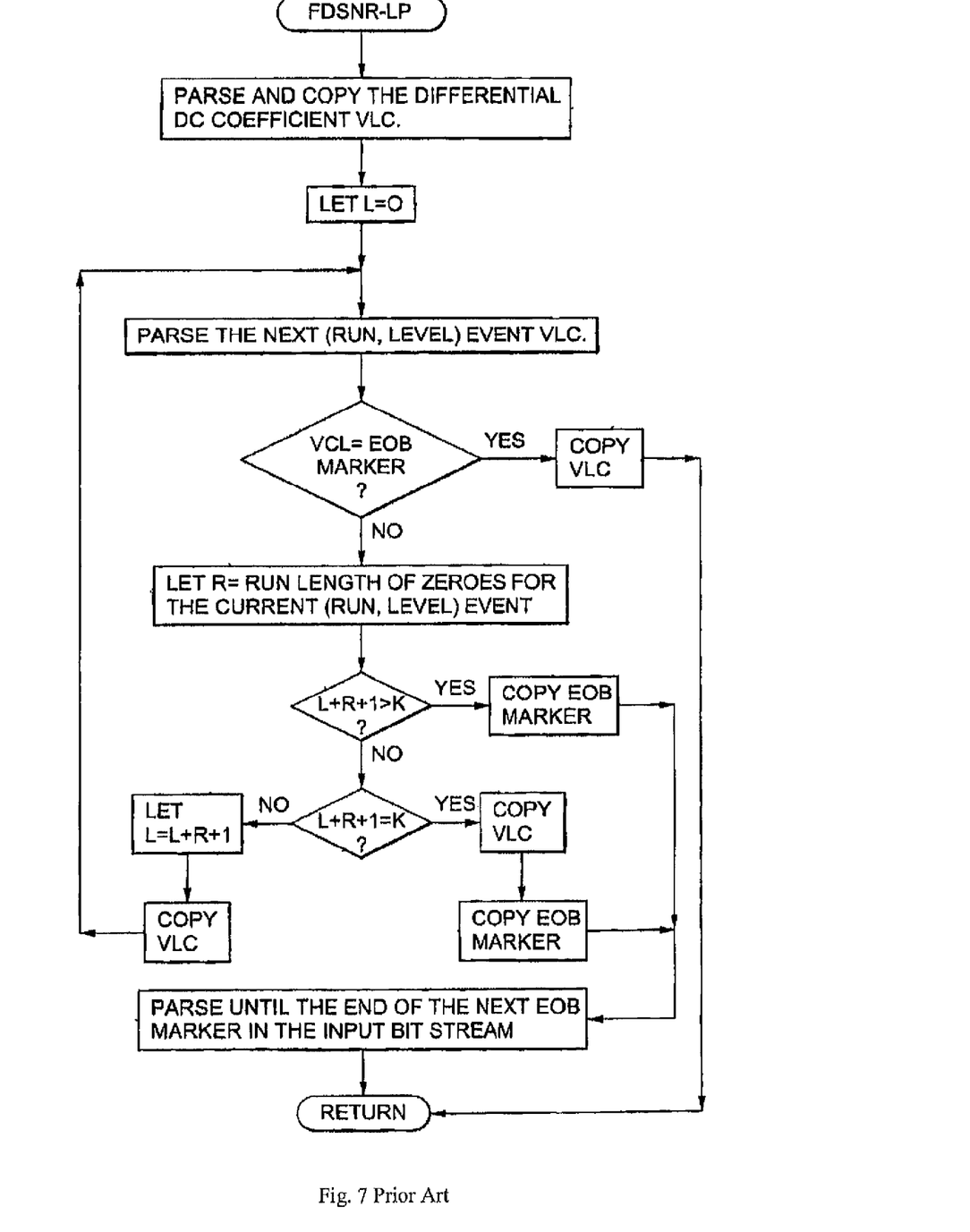

FIGS. 4 and 5 show an apparatus and method flow diagram as described in U.S. Pat. No. 6,763,070. The system described herein relates to a transrating scheme in which a cut-off index is determined and transform coefficients beyond this cut-off index are eliminated. The cut-off index is determined by the rate control information derived from the input bit-rate, required output bit-rate and previously processed macro blocks.

Last, with reference to the prior art, U.S. Pat. No. 6,937,770 discloses a system and apparatus for adapted bit-rate control for rate reduction of MPEG coded video. The system utilises a scale factor between average frame size (number of bits) of input stream and desired frame size of output. This scale factor is used to compute the number of bits used for each macro block of desired rate output stream. The scale factor may be dynamically changed to produce a desired rate output. Despite its low complexity and fast adaptivity, the scheme leads to problems such as distortion, heavy blocking and drift artefacts in high motion areas of a frame.

According to a first aspect of the present invention, there is provided a method of transrating a video signal made up of an input bit stream representative of frames of a video, each frame being made up of blocks of pixels, there being a corresponding block of data within the input bit stream for each block of pixels, the method comprising: for the bit stream of a frame of the video signal, identifying the type of frame; and for certain types of frame, disregarding a configurable proportion of the data in respect of plural blocks within the frame, thereby taking into account local motion activity within the frame.

Preferably, the proportion of data is disregarded in respect of all blocks within the frame. Preferably the proportion is the same in respect of all blocks.

Preferably, the input bit stream is representative of transform coefficients of frames of the video signal, e.g. a pre-compressed video signal in accordance with some format such as one of the MPEG formats, and wherein the disregarded data is a proportion of the non-zero transform coefficients for all blocks within a frame.

The local motion activity within a block of an image is dependent on the number of non-zero transform coefficients coded for that block. Therefore, by taking into account the number of coefficients on a per block basis, local motion activity is considered and accounted for in the transrating operation. This contrasts with known transrating operations in which the only factor taken into account when determining the size or number of bits that can be allocated to each macro-block in a frame of a transrated video signal is input bit-rate and desired output bit-rate. The use of some proportion (preferably substantially the same for all blocks within any frame) of the coefficients as opposed to fixed number ensures that motion activity within a block is accounted for and blocks in which there is motion do not suffer significant amounts of visual degradation.

Furthermore, the method allows for the transrating of reference inter or "P" frames. Without the use of the present method, transrating of P frames would increase the drift effect and blockiness especially in high motion scenes. In this present method this may be avoided by leaving the I frames within the input bit stream intact and directly copying them to the output bit stream and so motion vectors and other such parameters are copied directly to the output bit stream. Any loss of data in an I frame will propagate directly to related P and B inter frames. Using the original I frames within the output bit stream will reduce the drift effect significantly.

In the present case, since local motion activity is taken into account in the process of transrating, by disregarding a configurable proportion of the data in respect of all blocks within the frame, an even distribution of visual degradation is made so that distortion is less visible in the transrated video stream and heavy blocking and drift artefacts are avoided in high motion areas of the picture frame. A block is a subregion of pixels within a frame. In the example of MPEG-2 compression, a block is typically an 8×8 group of pixels.

Accordingly in a particular embodiment, the invention provides a method of transrating a video signal made up of a bit stream corresponding to a series of non-zero transform coefficients representative of frames of a video each frame being made up of blocks of pixels, there being a corresponding block of transform coefficients for each block of pixels, the method comprising for the bit stream of a frame of the video signal, identifying the type of frame; and in dependence on the type of frame, performing a transrating operation on the frame, wherein for certain types of frame, a configurable proportion of the transform coefficients are disregarded in respect of all blocks within the frame, thereby generating a transrated output bit stream.

Preferably, the method comprises identifying whether the frame is an I frame, a P frame or a B frame and, if it is identified as an I frame, performing no transrating operation on the frame.

Preferably, certain transform coefficients are removed from the frame by the insertion of an End of Block (EOB) code at a defined point within each block of the frame within the output bit stream.

Preferably, an output bit stream is generated comprising all the non-zero coefficients from blocks within I frames and only the maintained coefficients of blocks from the P and B frames.

Preferably, the input bit stream is an encoded MPEG-2 video signal.

Preferably, the input bit stream is in the form of a discrete cosine transform of an original image file.

According to a second aspect of the present invention, there is provided apparatus for transrating a video signal made up of a bit stream corresponding to a series of transform coefficients for frames of the video, each frame being made up of blocks of pixels, the apparatus comprising a receiver for receiving the encoded video signal in the form of a digital bit stream; a reader arranged upon receipt of a frame to identify the type of frame; and a controller for varying the operation performed on the frame in dependence on the type of frame, wherein for certain types of frame, a configurable proportion of the transform coefficients are disregarded in respect of all blocks within the frame, to thereby generate an output bit stream.

According to another aspect of the present invention, there is provided a method of transcoding a video signal made up of an input bit stream representative of frames of a video, each frame being made up of blocks of pixels, there being a corresponding block of data within the input bit stream for each block of pixels, the method comprising for the bit stream of a frame of the video signal, identifying the type of frame; and for certain types of frame, disregarding a substantially equal proportion of the data irrespective of the actual amount of data required to represent the block in respect of plural blocks or each block within the frame, thereby taking into account local motion activity within the frame.

BRIEF DESCRIPTION OF THE DRAWINGS

Examples of embodiments of the present invention will now be described by way of example only with reference to the accompanying drawings, in which.

BRIEF DESCRIPTION OF PREFERRED EMBODIMENTS

The following description is in relation to a transrator as one particular example of a transcoder.

Figure 8:
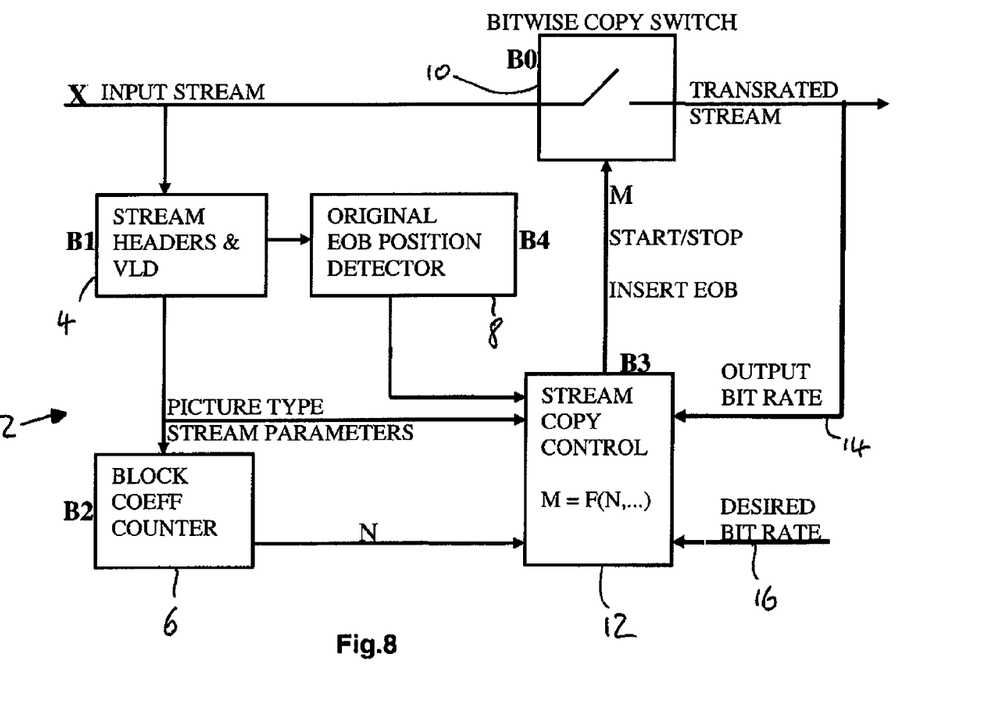
FIG. 8 shows a schematic representation of an example of a transrator.

The transrator of FIG. 8 is arranged to receive an input bit stream of video data X and produce a transrated output bit stream of video data Y. The transrator 2 has a header decoder 4 arranged to decode the header of each received frame. A block coefficient counter 6 is provided for counting the number of non-zero transform coefficients N within each block of the stream of data preferably only for inter frames. Of course, the blocks of data within the input stream X correspond to blocks of pixels, e.g. 8×8 or 4×4, within a frame of the received video signal. The number of non-zero coefficients N is only determined for certain types of frames, preferably the inter frames (both P and B frames).

The transrator is arranged to discard a certain, configurable proportion of the non-zero transform coefficients in respect of plural (preferably all) blocks within a frame being processed. Local motion activity in a block is related to the number N of non-zero transform coefficients for that block. Thus, local motion activity is taken into account, since an even distribution of visual degradation will be made to all blocks within the frame and not concentrated within blocks which are part of a motion sequence. If a fixed number of coefficients (as opposed to some proportion or derived value based on a mathematical function) were used for every block irrespective of the actual number necessary accurately to represent the block then the effect on blocks of a high number of coefficients would be disproportionately large. Since blocks of local motion have a larger number of coefficients the effect would be to concentrate degradation around those blocks. Preferably the same proportion of coefficients is disregarded in respect of all blocks within any frame.

As will be explained below, it is preferred that this is achieved by determining an integer number M, which is a function of N, for each block, and then by retaining the first M non-zero coefficients whilst discarding the remaining N-M non-zero coefficients.

An Original End Of Block position detector 8 is provided to detect the position of an end of block code that will typically be provided between blocks of coefficients within the input stream X.

A switch 10 is provided that is arranged when closed to copy bits from the input stream X directly to the output stream Y. When the switch 10 is opened, the direct copying of bits from the input stream X to the output stream Y is stopped. In its place, a stream of bits is provided via the stream copy control 12. The stream copy control 12 is arranged to send an open or closed or "start" and "stop" signal to the switch 10.

The header decoder 4 is used to decode the headers from blocks to enable variable length decoding to take place. The EOB position detector 8 detects the bit position of the original EOB code in the input stream X and communicates this position to the stream copy control 12. As mentioned above, the block coefficient counter 6 is arranged to count the number of non-zero coefficients N within a block and communicate the determined number N to the stream copy control 12.

A feedback signal 14 is provided to the stream copy control 12 from the output video stream Y. In addition, a desired bit-rate signal 16 is also provided to the stream copy control 12. Thus, a number of inputs are provided to the stream copy control 12 including the number of non-zero coefficients in each block within a frame represented by N, the picture or frame type (I, P or B), various stream parameters, a desired bit-rate, the achieved output bit-rate and the position of the original EOB code within the input bit stream X.

In use, it is preferred that unless there is an inter frame, e.g. a P or B frame, the stream copy control 12 sends a signal to the switch 10 to copy all bits of the input stream X to the output stream Y. Copying is performed on a bitwise basis and not on a byte or word basis. In addition, start codes and header information of the inter frames along with motion information are all copied by the switch 10 to the output bit stream X.

Based on the inputs it receives, the stream copy control 12 decides where and when an EOB code must be inserted in the output stream. Insertion of an EOB code requires the switch 10 to be stopped, i.e. effectively opened, such that the required EOB code can be inserted into the output stream Y. No further bits from the input stream are copied to the output stream Y until the original EOB code in the input stream is detected by the EOB position detector 8. Once the original EOB is detected by the EOB position detector 8, the stream copy control 12 sends a signal to the switch 10 to resume a bit copy operation until the next EOB code insertion is carried out. This process continues until all blocks within a frame are processed.

Thus, it can be seen that there is no requirement for any re-quantisation or variable length decoding, de-quantisation, inverse transformation, quantisation, forward transformation and variable length encoding as is required where the input video stream is to be re-quantised. The process is therefore computationally simple.

The apparatus of FIG. 8 provides a good compromise between complexity, quality and adaptation speed by employing an open loop architecture that truncates transform coefficients in parsing order and producing as a result a lower bit-rate video stream.

Furthermore, the example shown in FIG. 8 provides a fast, low complexity, transform domain transrator which uniformly distributes any visual degradation to all blocks within a frame, e.g. 8×8 pixel blocks, by taking into account local motion activity on a per block basis. The utilisation of a feedback signal from the output stream Y together with a desired bit-rate input enable fast and simple dynamic bit-rate adaptation.

The apparatus takes into account local motion activity and makes an even distribution of visual degradation to all blocks within any particular frame thereby to make distortion less visible and to prevent heavy blocking and drift artefacts in high motion areas of a frame. The conversion rate can be dynamically altered in dependence on instantaneous bit-rate requirements while still taking into account local motion activity.

The apparatus and method takes advantage of the fact that transform coefficients above a certain frequency level require a large number of bits to encode but add little to the image quality. This is particularly so on inter frames in which, typically, only the difference block, after motion compensation, is transform encoded. The difference blocks due to the motion compensation generally have less correlation than the absolute blocks in intra frames and blocks within the frames. Less correlation reduces the overall importance of the transform coefficients and in particular of high frequency transform coefficients. Therefore, the elimination of these bit-consuming coefficients will not harm the resulting image quality in a significant way, but will produce a substantial reduction of the bit-rate of the video stream.

Thus, a block adaptive truncation is applied in dependence on the type of frame, i.e. only to certain of the frames, typically P and B frames, and this is achieved by the insertion of an EOB code in the corresponding output bit stream before the position that it would appear were the output bit stream a complete copy of the input bit stream.

As mentioned above, the stream copy control 12 enables a block adaptive truncation of the transform coefficients by generating a number M representing the first M non-zero coefficients (out of a total N). The first M non-zero coefficients are stream copied in bitwise order to the output before the insertion of a new EOB code. M is a function of parameters including any or all of N, picture type, block position in the picture, picture position in a group of pictures (GOP), output bit-rate and other stream parameters. If M is a proportion of N and a function of the picture type and target bit-rate, drift effect and blocking artefacts are significantly reduced. Any suitable relation between M and N may be used which, as will be explained below, need not be linear. If M is determined to be greater than N, all transform coefficients in the block are kept and none are disregarded. If M, when calculated, is not an integer, rounding is performed to determine an integer value for M.

As mentioned above, for intra frames all the data is directly copied from the input bit stream to the output stream. All information other than the inter frame transform coefficients in the input stream is also copied into the output bit stream. Inter frame transform coefficients are fully or partially copied to the output bit stream such that for a video the bit-rate of the output bit stream will be reduced as compared to that of the input bit stream.

Figure 9:
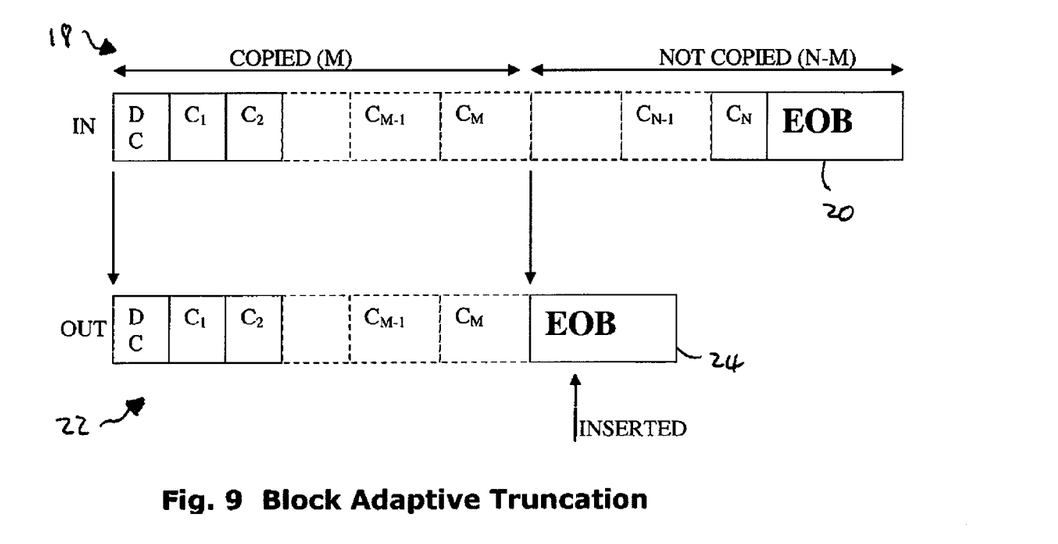
FIG. 9 is a schematic representation showing block adaptive truncation.

FIG. 9 shows a schematic representation of a block from an input stream and the corresponding block produced as part of the output stream using apparatus such as that shown in FIG. 8. The example of FIG. 9 assumes that a discrete cosine transform has first been used to compress the input video stream. Such compression is used in, for example, MPEG-2 compression. Of course, any suitable transform can be used to generate the transform coefficients and indeed other frequency space transforms are used in other video compression algorithms and techniques.

The block 18 from the input stream is made up of a quantised discrete cosine coefficient and a total of N run length codes for quantised DCT coefficients taken from a zig-zag scan order corresponding to a block of pixels within a frame of the video represented by the input stream. As can be seen, there are a total of N non-zero coefficients after which an EOB code 20 is provided within the bit stream.

A block 20 from the output stream comprises M components followed by an EOB code 24. The EOB code is inserted into output bit stream by the stream copy control 12 within the apparatus of FIG. 8. It can be seen that the components $C_1$ to $C_M$ are the same in both the block 18 from the input bit stream and the block 22 from the output bit stream. Thus, no processing is required of the first M non-zero coefficients of any block from the input bit stream. The remaining N minus M coefficients are simply discarded.

Given that the block of coefficients $C_1$ to $C_M$ within the output bit stream codes for the corresponding block of coefficients $C_1$ to $C_N$ within the input stream, a reduction in bit-rate has been achieved whilst taking into account local motion activity, without any complex processing and without introducing significant distortion into the processed video.

The value of M can be, but is not necessarily, restricted to a constant proportion of N such that M is equal to N multiplied by a constant $\alpha$. Thus, the relationship between M and N, in one example, can be expressed as follows:

$$M = \alpha \times N$$

where $\alpha$ is a number between zero and one and where $\alpha$ may itself be a function of other stream parameters including, for example, any or all of picture coding type, output bit-rate and desired output bit-rate. Since $\alpha$ is varied on a per block basis as a function of output bit-rate and desired bit-rate, dynamic adaptation of output bit-rate to desired bit-rate can be achieved. Furthermore, instantaneous variation of $\alpha$ stabilises the output bit-rate and can be controlled so that the output bit-rate is always just below a desired bit-rate, thereby complying with channel bandwidth requirements. The degree to which $\alpha$ may be varied can be quite small so that the benefit of distributing the visual degradation across all blocks is not lost by the variation between blocks of $\alpha$.

Block adaptive truncation of transform coefficients in frames produces low drift and low bit-rate streams by allowing transrating of P reference frames in addition to the B inter frames. The proposed architecture, as shown in FIG. 8, does not perform any quantisation, inverse quantisation, transform, inverse transform, motion vector search or variable length encoding. It is an extremely low complexity architecture which in practice simply performs header decoding, non-zero transform coefficient counting and EOB code insertion. The computational requirements are relatively low bearing in mind the output quality, the bit-rate reduction and speed achieved.

As mentioned above, it is not necessary that the relationship between N and M is linear. Having a relationship defined by M=a N does not guarantee a linear relationship between input and output bit-rates. It is clear that for a given block, the larger $\alpha$ is, the more bits are consumed for that block. Hence, $\alpha$ can be updated using a least mean squares (LMS) type of algorithm to obtain the desired output bit-rate. An example would be as follows:

$$\alpha_P(t+1) = \alpha_P(t) + \mu(p - p(\alpha_P(t)))$$

$$\alpha_B(t+1) = \alpha_B(t) + \mu(b - b(\alpha_B(t)))$$

where t represents the update time, b and p are the target bit consumption at the block, macroblock, slice or frame level for B and P frames respectively, $b(\alpha)$ and $p(\alpha)$ are the resultant transrator bit consumption as a function of $\alpha$, $\mu$ ($\mu>0$) is the step size which is chosen small enough to have a stable adaptation algorithm and large enough to make the system converge to the target bit-rate.

In this system, b and p may be computed easily offline.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software or hardware. Moreover, embodiments of the present invention may be employed with a variety of communication protocols and should not be restricted to the ones mentioned above. For example the techniques of the present invention can be implemented between a landline network and a wireless network. The transform coefficient filtering can be applied to one or two dimension transform coefficients for a wide variety of data formats. Therefore, the scope of the invention should be determined with reference to the appended claims.

Figure 10:
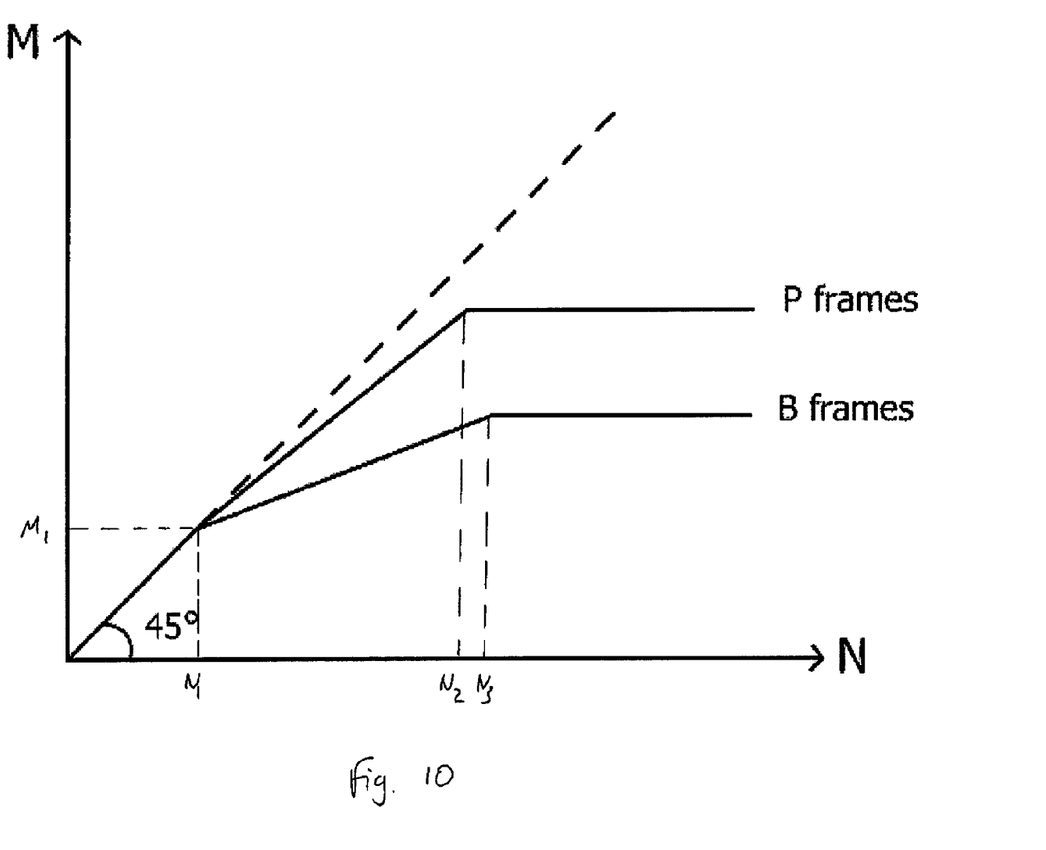
FIG. 10 is an example of a possible relationship between parameters M and N used in an embodiment of a transcoding method.

FIG. 10 shows an example of a possible relationship between the parameters M and N. It will be appreciated that in the examples shown, the parameters M and N are different for P and B frames. In the examples shown, up to the value $N_1$ there is a linear relationship between the value for (M,N) of (0,0) and ($M_1$, $N_1$). Beyond this value of $N_1$ the value of $\alpha$ reduces and although the relationship is still linear, it can best be defined by the equation:

$$M = \alpha N + c.$$

Beyond the values $N_2$ and $N_3$ (for P and B frames respectively) the value of M remains constant. The example of FIG. 10 is merely to show that any suitable relationship between M and N can be derived and used.

Embodiments of the present invention have been described with particular reference to the examples illustrated. However, it will be appreciated that variations and modifications may be made to the examples described within the scope of the present invention.

The invention claimed is:

1. A method of transcoding a video signal made up of an input bit stream representative of frames of a video, each frame being made up of blocks of pixels, there being a corresponding block of data within the input bit stream for each block of pixels, the method comprising:
for the bit stream of a frame of the video signal, identifying the type of frame; and
for certain types of frame, disregarding a substantially equal proportion of the data in respect of plural blocks within the frame to account for local motion activity within the frame,
wherein the input bit stream is representative of the non-zero transform coefficients of frames of the video signal and wherein the disregarded data is a proportion of the non-zero transform coefficients for all blocks within a frame, and
wherein the proportion of transform coefficients is determined by variation at a factor of $\alpha$, wherein there are N non-zero transform coefficients in a block of a received frame and M non-zero transform coefficients in a block of the transrated video stream, and wherein $M=\alpha N$.

2. A method according to claim 1, wherein a proportion of the data in respect of all blocks in any frame is disregarded.

3. A method according to claim 1, comprising identifying whether the frame is an I frame, a P frame or a B frame and if it is identified as an I frame, performing no transrating operation on the frame.

4. A method according to claim 3, wherein if the frame is a P frame or a B frame the method comprises filtering the frame by removing certain high transform coefficients for all blocks within the frame.

5. A method according to claim 4, wherein the certain transform coefficients are removed from the frame by the insertion of an End of Block code at a defined point within each block of the frame within the output bit stream.

6. A method according to claim 5, in which the position at which an End of Block code within the output bit stream is provided is varied to control the bit-rate of the transrated video signal.

7. A method according to claim 1, wherein $\alpha$ is varied in real time to control dynamically the bit-rate of the output bit stream.

8. A method according to claim 1, wherein an output bit stream is generated comprising all the coefficients from blocks within I frames and only the retained coefficients of blocks from the P and B frames.

9. A method according to claim 1, comprising providing a switch arranged in one configuration to switch the received bit stream directly to the output bit stream and in a second configuration to switch a transcoded bit stream of the input bit stream to the output stream.

10. A method according to claim 9, wherein the switch is controlled in dependence on one or more of N, the desired output bit-rate, the type of frame, block position in the picture, picture position within a group of pictures (GOP), output bit-rate and other stream parameters.

11. A method according to claim 1, wherein there is a non-linear relationship between M and N.

12. A method according to claim 11, wherein the value of a is updated by a method such as a least mean squares relationship.

13. A method of transcoding a video signal made up of an input bit stream representative of frames of a video, each frame being made up of blocks of pixels, there being a corresponding block of data within the input bit stream for each block of pixels, the method comprising:
for the bit stream of a frame of the video signal, identifying the type of frame; and
for certain types of frame, disregarding a substantially equal proportion of the data in respect of plural blocks within the frame, thereby taking into account local motion activity within the frame
wherein the proportion of transform coefficients is determined by variation at a factor of $\alpha$, wherein there are N non-zero transform coefficients in a block of a received frame and M in a block of the transrated video stream, and wherein $M=\alpha N$,
wherein there is a non-linear relationship between M and N,
wherein the value of a is updated by a method such as a least mean squares relationship
in which $\alpha$ is defined by the following equations $$\alpha_P(t+1)=\alpha_P(t)+\mu(p-p(\alpha_P(t)))$$

$$\alpha_B(t+1)=\alpha_B(t)+\mu(b-b(\alpha_B(t)))$$

in which
t represents the update time,
b and p are the target bit consumption at the block, macroblock, slice or frame level for B and P frames respectively,
$b(\alpha)$ and $p(\alpha)$ are the resultant transrator bit consumption as a function of $\alpha$, and
$\mu$ ($\mu>0$) is the step size which is chosen small enough to have a stable adaptation algorithm and large enough to ensure convergence to the target bit-rate.

14. Apparatus for transcoding an encoded video signal made up of a bit stream corresponding to frames of a video, each frame being made up of blocks of pixels, the apparatus comprising:
a receiver for receiving the encoded video signal in the form of a digital bit stream;
a reader arranged upon receipt of a frame to identify the type of frame; and
a controller arranged for certain types of frame, to disregard a proportion of the data in respect of plural blocks within the frame to account for local motion activity within the frame,
wherein the input bit stream is representative of the non-zero transform coefficients of frames of the video signal and wherein the disregarded data is a proportion of the non-zero transform coefficients for all blocks within a frame, and
wherein the proportion of transform coefficients is determined by variation at a factor of $\alpha$, wherein there are N non-zero transform coefficients in a block of a received frame and M non-zero transform coefficients in a block of the transrated video stream, and wherein $M=\alpha N$.

15. Apparatus according to claim 14, wherein the controller is arranged to disregard the proportion of data in respect of all blocks within the frame.

16. Apparatus according to claim 14, comprising an End of Block position detector to detect the position within the input bit stream of the end of blocks.

17. Apparatus according to claim 16, comprising a switch arranged in one configuration to copy the input bit stream directly to the output bit stream and in a second configuration to copy processed frames into the output stream.

18. Apparatus according to claim 17, comprising a block coefficient counter to count the coefficients within a received block and to provide the number N of non-zero coefficients to a control unit arranged to control the switch, the number N being dependent on motion activity within the block.

19. Apparatus according to claim 18, comprising a control unit arranged to determine a number M of coefficients to be included in a block within the output stream.

20. Apparatus according to claim 19, wherein the control unit is configured to determine the number M in dependence on various parameters including one or more of desired output bit-rate, actual output bit-rate, frame type and the number N of non-zero coefficients within a received block.

21. Apparatus according to claim 20, wherein the control unit is arranged to insert an End of Block code within the output bit stream at a position within a block of coefficients within the output stream such that the block will include only M coefficients.

22. Apparatus according to claim 21, wherein the relationship between M and N is linear such that:

$$M=\alpha N.$$

23. Apparatus for transcoding an encoded video signal made up of a bit stream corresponding to frames of a video, each frame being made up of blocks of pixels, the apparatus comprising:
 a receiver for receiving the encoded video signal in the form of a digital bit stream;
 a reader arranged upon receipt of a frame to identify the type of frame; and
 a controller arranged for certain types of frame, to disregard a proportion of the data in respect of plural blocks within the frame, thereby taking into account local motion activity within the frame,
 wherein the controller is arranged to disregard the proportion of data in respect of all blocks within the frame; and
 a control unit arranged to determine a number M of coefficients to be included in a block within the output stream,
 wherein the control unit is configured to determine the number M in dependence on various parameters including one or more of a desired output bit-rate, an actual output bit-rate, a frame type and a number N of non-zero coefficients within a received block,
 wherein the relationship between M and N is linear such that:

$$M=\alpha N,$$

in which $\alpha$ is defined by the following equations $$\alpha_P(t+1)=\alpha_P(t)+\mu(p-p(\alpha_P(t)))$$

$$\alpha_B(t+1)=\alpha_B(t)+\mu(b-b(\alpha_B(t)))$$

in which
 t represents the update time,
 b and p are the target bit consumption at the block, macroblock, slice or frame level for B and P frames respectively,
 $b(\alpha)$ and $p(\alpha)$ are the resultant transrator bit consumption as a function of $\alpha$, and
 $\mu$ ($\mu>0$) is the step size which is chosen small enough to have a stable adaptation algorithm and large enough to ensure convergence to the target bit-rate.

24. Video playback apparatus comprising a transcoder according to claim 14.

* * * * *